United States Patent
Bhandari et al.

(10) Patent No.: US 6,424,475 B1
(45) Date of Patent: Jul. 23, 2002

(54) MAGNETIC HEAD CONDUCTIVITY TESTING AND FORM FACTOR DETERMINATION IN A READ/WRITE DEVICE

(75) Inventors: Sanjay Manohar Bhandari, Sunnyvale; Ramesh Selvaraj, Santa Clara, both of CA (US); Joao Nuno V. L. Ramalho, Bieville-Beuville (FR); Patrick LeClerc; Eric Pieraerts, both of Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 74 days.

(21) Appl. No.: 09/586,464

(22) Filed: Jun. 3, 2000

(51) Int. Cl.$^7$ .................. G11B 27/36; G11B 5/02; G11B 5/09
(52) U.S. Cl. .................. 360/31; 360/25; 360/46; 360/67
(58) Field of Search .................. 360/25, 31, 46, 360/67, 68

(56) References Cited

U.S. PATENT DOCUMENTS

| | | | |
|---|---|---|---|
| 5,045,811 A | * 9/1991 | Lewis | 331/1 A |
| 5,589,777 A | * 12/1996 | Davis et al. | 324/537 |
| 6,111,717 A | * 8/2000 | Cloke et al. | 360/67 |

* cited by examiner

Primary Examiner—Regina N. Holder
(74) Attorney, Agent, or Firm—Harold Tsiang

(57) ABSTRACT

A preamplifier for a multi-head disk drive includes a circuit that tests the connectivity of each magnetic head in the disk drive by driving each head with a small current, and detecting the flow of this current. By driving and sensing the current flowing through the magnetic heads, both open-circuit faults and bridging faults can be detected. In a preferred embodiment, each head is tested sequentially. The result of each test is stored as a bit value in a register, for subsequent access. The circuit may be activated by a test device, or by a microcontroller in an assembled disk drive. To minimize costs, the circuit is integral to the circuitry that is conventionally used to read and write information via the magnetic heads. The oscillator that is conventionally used to characterize the read heads of a disk drive is used in a preferred embodiment to control the sequencing of tests through each head. A very low common mode voltage is provided during the testing of each write head, to minimize ESD (electro-static discharge) related problems. In a test mode, each write head is selected after a read head is selected, thereby minimizing the possibility of an accidental corruption of the data when the write head is tested. To avoid a degradation of performance, and in particular a degradation of rise/fall times in the write driver, the circuitry that controls the test voltages and currents is provided substantially up-stream of the write driver.

17 Claims, 4 Drawing Sheets

FIG. 1 [Prior Art]

MAGNETIC HEAD CONDUCTIVITY TESTING AND FORM FACTOR DETERMINATION IN A READ/WRITE DEVICE

BACKGROUND OF THE INVENTION

1. Field of the Invention

This invention relates to the field of devices that read and write information from and to a magnetic medium, and in particular to the testing of the magnetic heads within a drive device.

2. Description of the Prior Art

Magnetic recording devices are used to write information to, or read information from, a magnetic medium, such as a floppy disc or a hard disc for storing programs and data in a computer.

The read channel for a magnetic recording device includes a sensor in the form of a magneto-resistive head in close proximity with the magnetic medium. When the magnetic material is moved relative to the sensor, a flux is induced in the sensor in dependence upon the local orientation of the magnetic material, thereby generating an information signal that can be amplified and then decoded.

When information is written in digital form, such as for computer data storage or digital recording of music, a current is generated by a write channel and passed through a thin film head in one direction to write a binary "0" and in the opposite direction to write a "1". When the medium is read by the sensor, or read head, the portions recorded with a binary "0" will induce a current in the head in the one direction and portions recorded with a binary "1" will induce a current in the opposite direction, which is then decoded by a bit detector.

To achieve high density or high speed, or both, multiple heads are often used. A hard disk drive, for example, typically includes multiple magnetic discs, or platters, each side of which is used for reading and writing information. The read heads and write heads are mounted on movable arms positioned at each side of the disk. FIG. 1 illustrates an example block diagram of a "pre-amp" 100 for a disk drive with multiple read heads 121a–121n and multiple write heads 141a–141n. This pre-amp 100 is typically controlled by a microcontroller 50 in the disk drive that processes commands from a higher level system (not shown) for reading, writing, and configuring the disk drive. Each head 121a–n, 141a–n is uniquely addressable by a head selector 110, in combination with a signal (R/W') that indicates whether a read head 121a–n or a write head 141a–n is being accessed. Typically, the head selector selects one of the heads H based on an address provided by the microcontroller 50 on the address bus 102. Each head has an associated "Reader Front End" (RFE) 120. The RFE 120 contains an amplifier 125 that provides the read signal from the selected read head 121 to a "Reader Back End" (RBE) 130. The RBE 130 further processes the read signal, via filters, amplifiers, and the like 132 to reduce noise and other anomalies that are associated with the response of a read head 121 to the magnetic flux on a magnetic medium (not shown) in the vicinity of the read head 121. As illustrated, due to the relatively low signal to noise ratio that is common in disk drives, differential signaling is used. The buffer 135 provides the differential read signals RDp and RDn to a read/write channel interface device 190 that converts this differential input into a logic value corresponding to the information that is encoded as flux on the magnetic medium in the vicinity of the select read head 121. This logic information is communicated to a microcontroller 50, typically as a collection of logic values forming a byte or word. The communicated information may be, for example, the information bits of a database file, a text or graphics file, an audio or video recording, and so on. In a complimentary manner, information that is to be written to the magnetic medium in the vicinity of the select write head 141 is provided as differential write signals WDp and WDn that are processed by a "Write Front End" (WFE) 150 and provided to the "Write Part Per Head" (WPPH) 140 corresponding to the selected write head 141. The WFE 150 includes an input buffer 155, filters, amplifiers, and the like 152, whose primary function is to convert the different voltage inputs WDp and WDn from the channel interface 190 into a differential current output that is provided to the write amplifier 145 of the selected WPPH 140.

Illustrated in FIG. 1 is an MR bias setting block 160 that is configured to control the amount of bias current that is applied to each read head 121. Bias current is typically provided to magneto-resistive (MR) heads to improve noise immunity and linearity. Also illustrated in FIG. 1 is a current source 170 that is configured to provide the relatively high (0.1 amps) current that is used for driving the thin-film (TF) heads to produce the required magnitude of flux on the magnetic medium. Both the bias setting block 160 and the write current source 170 are programmable by the microcontroller 50 to provide dynamically adjustable currents, to compensate for manufacturing variations in the performance of the read 121 and write 141 heads. Not illustrated, but common in the art, the pre-amp 100 also includes circuitry that is used to test and characterize the performance of the read 121 and write 141 heads so that the microcontroller 50 can effect the required compensation.

One of the most critical steps in the assembly of a disk drive is the sorting and connecting of the read 121a–n and write 141a–n heads to the preamplifiers 125 and drivers 145 that are used to sense or drive the heads. This is often a yield limiting operation, and costly to repair. Disk drive manufacturers require that preamplifiers contain test capabilities that can be used to determine whether each head is connected to the preamplifier, before final assembly, and as required after final assembly. To remain competitive, however, the cost of adding such capabilities to a preamplifier must be kept to a minimum, and the test circuitry must not degrade the operational performance of the preamplifier. Because the test mode is available after the disk drive is placed in operational use, the test mode must be configured to assure that existing data on the storage medium is not corrupted during the test.

BRIEF SUMMARY OF THE INVENTION

It is an object of this invention to provide a cost effective method and system for testing magnetic heads in a disk drive. It is a further object of this invention to provide a method and system for determining the number of magnetic heads that are connected in a disk drive (the "form factor" of the disk drive) without adversely affecting the performance of the operational circuitry.

These objects and others are achieved by providing a circuit that tests the connectivity of each magnetic head in a disk drive by driving each head with a small current, and detecting the flow of this current. By driving and sensing the current flowing through the magnetic heads, both open-circuit faults and bridging faults can be detected. In a preferred embodiment, each head is tested sequentially. The result of each test is stored as a bit value in a register, for subsequent access. The circuit may be activated by a test device, or by a microcontroller in an assembled disk drive. To minimize costs, the circuit is integral to the circuitry that is conventionally used to read and write information via the magnetic heads. The oscillator that is conventionally used to characterize the read heads of a disk drive is used in a preferred embodiment to control the sequencing of tests through each head. A very low common mode voltage is provided during the testing of each write head, to minimize ESD (electro-static discharge) related problems. In a test mode, each write head is selected after a read head is selected, thereby minimizing the possibility of an accidental corruption of the data when the write head is tested. To avoid a degradation of performance, and in particular a degradation of rise/fall times in the write driver, the circuitry that controls the test voltages and currents is provided substantially up-stream of the write driver.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 2:
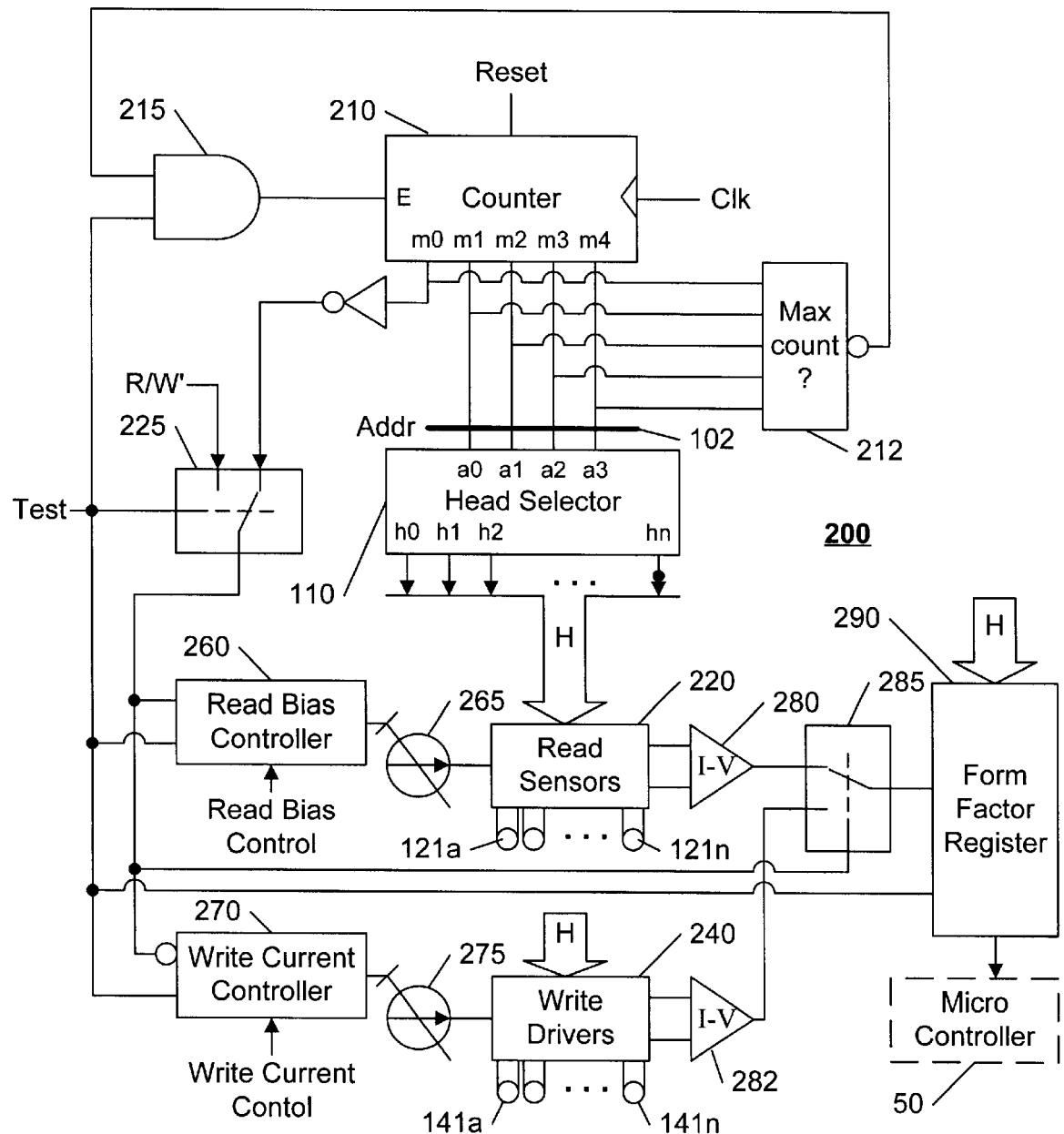
FIG. 2 illustrates an example block diagram of a disk drive test circuit in accordance with this invention.

FIG. 2 illustrates an example block diagram of a disk drive test circuit 200 in accordance with this invention. In a preferred embodiment, to minimize costs, this test circuit 200 is integrated within the same integrated circuit comprising the disk drive preamplifier 100 components discussed above. For ease of reference, items corresponding substantially with the conventional preamplifier 100 components comprise reference numerals that begin with "1", whereas items corresponding to the test circuit 200 of this invention comprise reference numerals that begin with "2".

The example test circuit 200 includes a counter 210 that sequentially addresses each head 121a–121n, 141a–141n in the disk drive via the head selector 120. The heads 121a–121n correspond to read heads, and are typically magneto-resistive (MR) heads. The heads 141a–141n correspond to write heads, and are typically thin film (TF) heads. For ease of reference the set of heads 121a–121n is hereinafter referred to as read heads 121, and the set of heads 141a–141m as write heads 141. The counter 210 communicates its current count to the selector 110 via the same address bus 102 that the microcontroller 50 uses to address the magnetic heads 121, 141.

Figure 1:
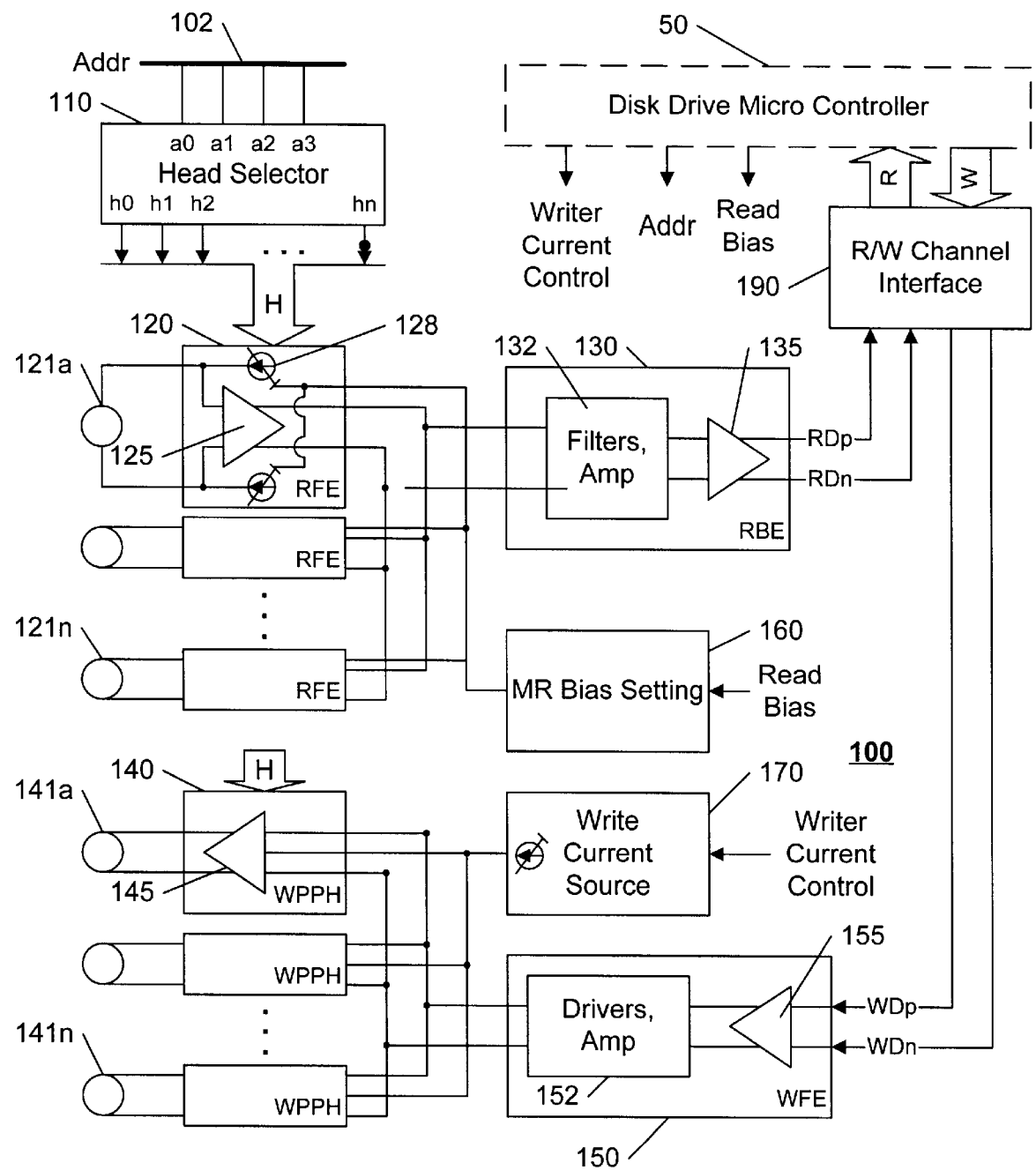
FIG. 1 illustrates an example block diagram of a prior art preamplifier that is configured to read and write information from and to sets of read and write magnetic heads.

The read sensors 220 include each of the read front end 120 components associated with each read head 121a–n, and the read back end 130 components of FIG. 1, and as discussed above, are primary configured to filter and amplify the signals received from the read heads 121 when a magnetic medium containing flux fields (not shown) is passed within the vicinity of the read heads 121, to provide information bits corresponding to the individual flux fields during normal operations. In accordance with this invention, the read sensors 220 are also configured to provide an output to a current converter 280, the output corresponding to the amount of DC current that is flowing through the select read head 121a–n.

In like manner, the write drivers 240 include each of the WPPH 140 components associated with each write head 141a–n, and the WFE 150 components of FIG. 1, and are primarily configured to inject a high current signal into the write heads 141, to cause a flux field to be formed on the magnetic medium (not shown) corresponding to information bits during normal operations. In accordance with this invention, the write drivers 240 are also configured to provide an output to a second current converter 282, the output corresponding to the amount of DC current that is flowing through the select write head 141a–n.

Figure 3:
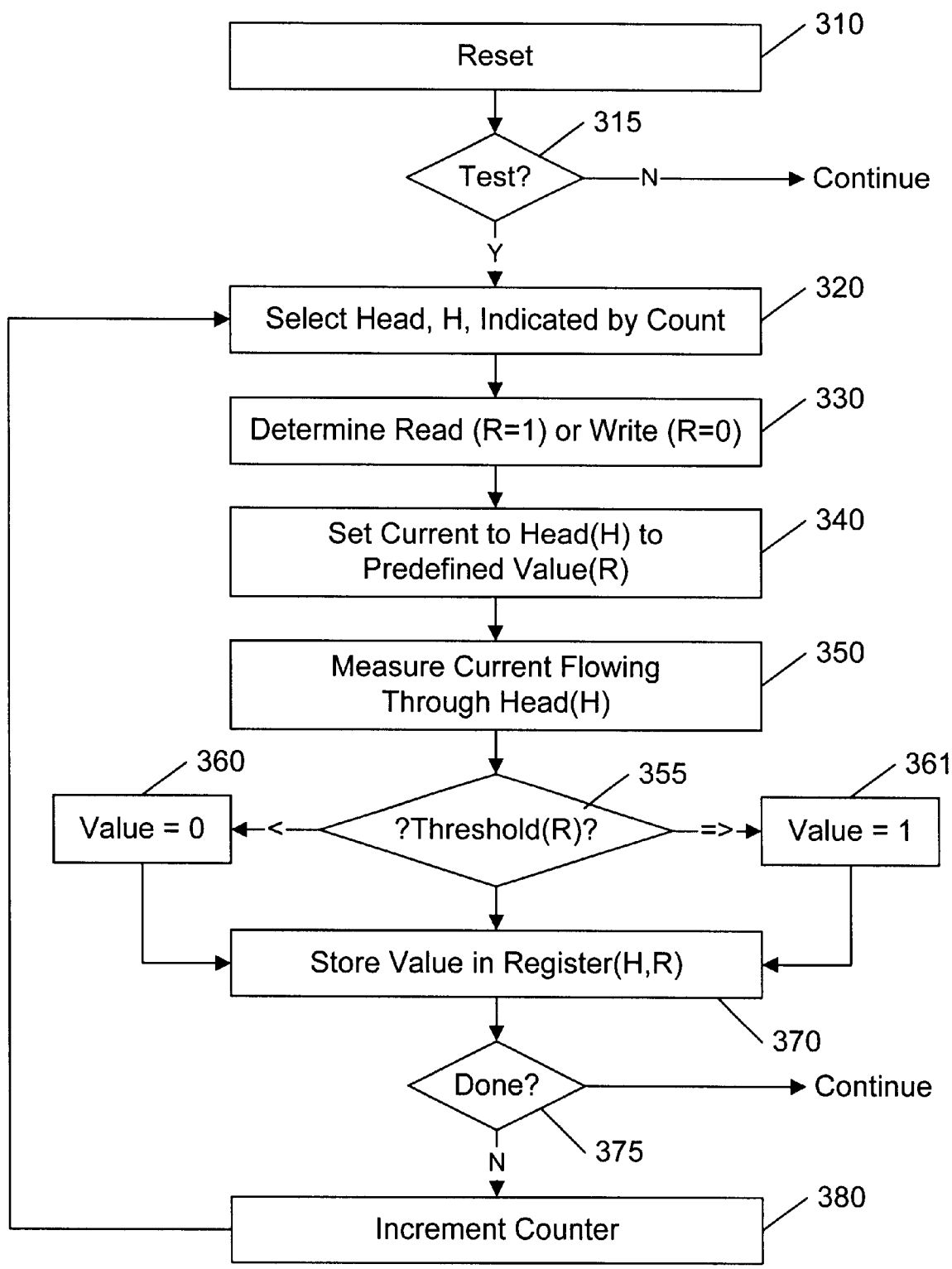
FIG. 3 illustrates an example flow diagram of a disk drive test circuit in accordance with this invention.

The operation of the test circuit 200 in FIG. 2 is best understood with reference to the example flowchart of FIG. 3. At block 310, a reset signal resets the counter 210. If, at 315, the test mode is enabled, the counter is enabled, via the gate 215. The logic block 212 determines whether the current count is equal to the maximum number of heads, n. The gate 215 enables the counter 210 when the test signal is asserted, and the current count of the counter 210 does not equal the maximum count. When the counter 210 is enabled, the current count is output to the address bus 102, and thereby to the head selector 110. This is illustrated at block 320 in FIG. 3, wherein the symbol H is used to represent the currently selected head. The counter 210 also provides an additional bit to distinguish whether a read head or a write head is being selected. In the example circuit 200, the least significant bit m0 is illustrated as providing this function, although any bit will suffice. Using the least significant bit, the test circuit alternately selects read and write heads; using the most significant bit, the test circuit would test all of one head type, then all of the other head type. In a preferred embodiment, the least significant bit m0 is used to alternately toggle between a read head, then a write head; in this manner the likelihood of accidentally overwriting a stored value on the storage medium during a test of the write head is minimized. At block 330 in FIG. 3, the symbol R is used to represent whether the head type is a read head or not.

At block 340, a DC current value is set for applying to the selected head. Due to the different characteristics of MR and TF heads, different currents are preferably provided to read and write heads. In a preferred embodiment approximately 1 mA is used to drive the read heads, and 2 mA is used to drive the write heads. These currents are set in the read bias control block 260 and the write current control block 270 of FIG. 2. The test signal controls whether the read bias control block 260 and write current control block 270 are operated in the test mode, or in response to the read bias and write current controls from the microcontroller 50. In a preferred embodiment, the read bias control 260 substantially corresponds to the conventional MR bias setting block 160 in FIG. 1, but modified to include the aforementioned test mode setting of a predefined DC current. In this embodiment, the current source 265 corresponds to the bias current sources 128 associated with each read head. Also in a preferred embodiment, the write current control 270 and current source 275 substantially correspond to the conventional write current source 170, but modified to include the aforementioned test mode setting of a predefined DC current. As noted above, in a normal operating mode, the write current source 170 provides a current that is substantially larger than the nominal test mode current of 2 mA. Although the read bias control 260 can effect the desired test mode current via a programming of the current source 265, a programming of the write current source will typically not have the required control resolution to achieve a 2 mA test mode current. Therefore, as illustrated, the test signal is applied directly to the current source 275 to effect a direct scaling of the current by at least one order of magnitude. In this manner, the program output of the write current control 270 adjusts the current source 275 relative to this reduce magnitude scale.

The current converters 280, 282 are configured to monitor the current that actually flows from the current sources 265, 275 through the select head, and to produce a voltage value corresponding to the detected current. In a preferred embodiment, the converters 280, 282 are current sensors that are present in conventional RFEs 120 and WPPHs 140. Preferably, a detected current above a given threshold provides one value, and below the given threshold, an opposite value. The detection and thresholding is illustrated at blocks 350 and 355. If the current is below the threshold, at 355, the example value is set to 0, at 360; otherwise, the value is set to 1, at 361. The resultant value is stored in a register, at a location corresponding to the selected head value H, for each head-type R. This register is illustrated in FIG. 2 as the form-factor register 290, discussed further below.

A clock signal triggers the counter 210 periodically. If the counter 210 is enabled, this advances the count by one, thereby selecting a different head, as illustrated by the blocks 375–380 of FIG. 3. The process is continuously repeated, via the loop to block 320, until all the heads are tested, and the loop is terminated, at 375. This loop termination is effected in the example circuit 200 of FIG. 2 via the logic blocks 212, 215. When the count is equal to the maximum count, the output of the comparator block 212 goes low, and drives the output of the gate 215 low, thereby disabling the counter 210. The counter 210 is configured with a tri-state output, and does not load the address bus 102 when disabled.

After cycling through the maximum count, the form factor register will contain a bit value of "1" for each head 121a–n, 141a–n that is operably connected to the read sensors 220 and write drivers 240. A disconnected or absent head will be identified by a "0" in its associated bit position in the form factor register. The contents of the form factor register 190 are provided to the microcontroller 50, typically via a serial connection.

As presented, the circuit 200 in accordance with this invention provides for an automatic determination of an open-circuit in any head connection path. In a preferred embodiment, the circuit 200 is autonomous, so that any device, such as a piece of test equipment, can place the circuit 200 into the test mode by asserting the aforementioned test signal. In like manner, the resultant contents of the form factor register 180 is also provided to the test equipment, so that the conductivity of the heads to the preamp circuitry 240, 260 can be ascertained prior to the final assembly stages of a disk drive. After assembly, the microcontroller 50 can also be programmed to periodically test the heads for continued conductivity.

The term "form factor" is conventionally used to indicate the number of heads available in a given disk drive. An advantage of the current invention is an automated determination of the number of heads available, based on the content of the register 290. As is common in the art, identical devices are often used in a variety of configurations. Generally, differently configured devices are identified by setting "jumpers" to appropriate positions on a circuit board, and the microprocessor 50 is configured to read the configuration of such jumpers. The automated determination of the number of available heads eliminates the need to provide such jumpers, and eliminates the manufacturing step of appropriately placing the jumpers on the circuit board.

The following details are provided to facilitate a cost-effective embodiment of this invention that is particularly well suited for inclusion in a conventional disk drive preamplifier, such as the Philips' TDA 536x-series of disk drive preamplifiers. The application of these principles to other preamplifier devices will be evident to one of ordinary skill in the art in view of this disclosure.

Figure 4:
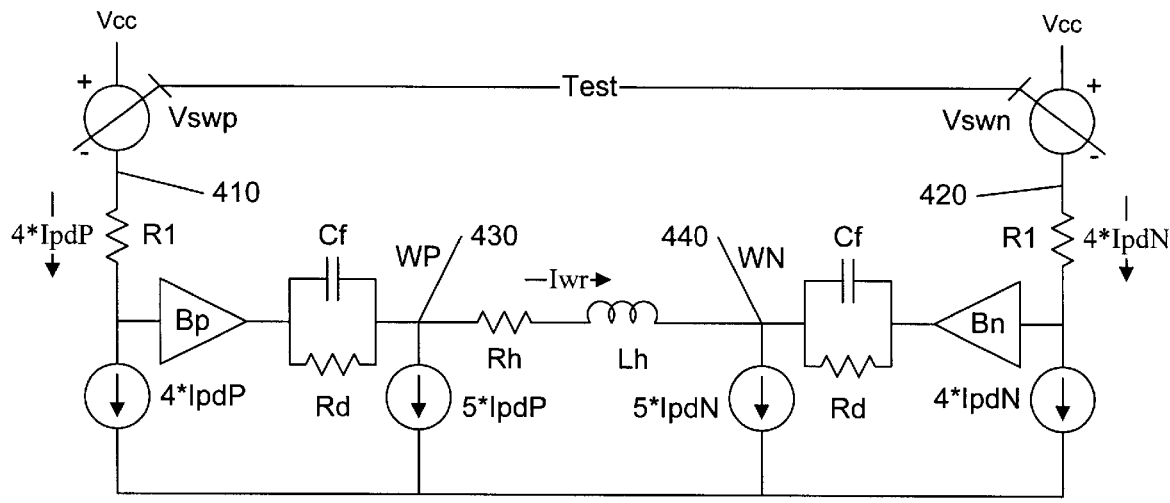
FIG. 4 illustrates an example block diagram of a write amplifier and write head in accordance with this invention.

FIG. 4 illustrates an example circuit model of a write driver and thin film head. The nodes WP 430 and WN 440 represent the output nodes of the write driver circuit to the thin film head. The inductance Lh represents the inductance of the thin film head, and the resistance Rh represents the resistance of the head and the interconnection of the head to the write driver circuitry. Typically, hard disk drive manufacturers prefer that the DC, or common-mode, voltages at the terminals WP 430, WN 440 of a thin film head are below 300 millivolts during test modes, to minimize potential ESD related problems. Also, as noted above, the current Iwr through the thin film head in the test mode in a preferred embodiment should be less than 2 milliamps. The node voltages 430, 440 are given as:

$$V(WP)=Vcc-VswP-4*IpdP*R1-VbP-(5*IpdP+Iwr)*Rd \quad (1)$$

$$V(WN)=Vcc-VswN-4*IpdN*R1-VbN-(5*IpdN-Iwr)*Rd \quad (2)$$

$$\text{(alternatively, } V(WN)=V(WP)-Iwr*Rh) \quad (2a)$$

where:

R1 is typically 244 ohms;

Rd is typically 34 ohms;

Rh is typically 16 ohms;

VbP and VbN are the voltages across the buffers Bp and Bn, respectively, and are typically equal to a base-emitter voltage drop of 0.75 volts; and IpdP and IpdN are drive currents, nominally 0.44 milliamps, and 0.44 milliamps+difference current, respectively, wherein the difference current for producing 2 mA of head current Iwr is approximately 0.07 milliamps.

To achieve the preferred near-zero common mode voltages at WP and WN with the above values, the voltage sources VswP and VswN are set to produce Vcc-VswP 410 and Vcc-VswN 420 voltage values of approximately 1.6 volts. This results in a voltage V(WP) and V(WN) of approximately zero volts, with the difference between the voltages V(WP) and V(WN) being 32 millivolts (16 ohms*2 milliamps). The voltages 410 and 420 are preferably provided using diode voltage drops. Current mirroring and other techniques, common in the art are employed in a preferred embodiment to provide voltages 410, 420 and currents IpdP, IpdN that are substantially constant, independent of variations in the supply voltage Vcc and/or the nominal operating temperature. Note that by adjusting the voltage sources VswP and VswN, rather than modifying the buffers Bp and Bn to produce the minimal common mode voltage at WP and WN, the switching performance of the write driver remains substantially unchanged. When the test mode is not enabled, the voltage sources VswP and VswN provide their normal operational voltages, and the switching performance is unaffected.

Figure 5:
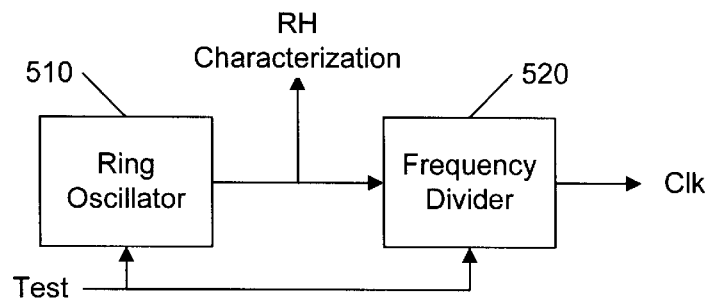
FIG. 5 illustrates an example clock circuit in accordance with this invention.

A typical disk drive preamplifier 100 includes capabilities for testing and characterizing read heads, so that parameters of the disk drive system can be optimized for improved performance based on the characteristic of each read head. A ring oscillator is typically used to generate the high frequency signal that is used to perform this characterization. In a preferred embodiment of this invention, the ring oscillator that is used for characterizing the read heads is also used to generate the clocking signal that is used to control the sequencing of the test of each head. FIG. 5 illustrates an example clocking system 500 that provides the clock signal (clk) of FIG. 2 that triggers the counter 210. The ring oscillator 510 is the ring oscillator that is typically provided to generate the high frequency signal that effects the read head characterization. Nominally, the period of the high frequency signal that is used for read head characterization is 15 nanoseconds. The frequency divider 520 is used to provide a longer test period for the conductivity test of this invention, nominally 2.5 microseconds or longer. Optionally, the ring oscillator 510 and/or the frequency divider 520 are configured to use the test signal of this invention to optimize the performance. For example, the frequency divider 520 can be disabled when not in the test mode, thereby saving power. Similarly, the ring oscillator 510 can be configured to operate at a lower frequency when in the test mode, reducing the number of stages in the frequency divider 520 that are required to provide the longer test period.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the test system described herein can also be used for finding faults other than open-circuits. If an independent addressing scheme is used for driving the head and for detecting the current flowing through the head, then short circuits between heads can also be detected. That is, if one head is selected for applying the test current, and a flow of current is detected in any other head, this is indicative of a short, or bridging fault, between the heads. These and other system configuration and optimization features will be evident to one of ordinary skill in the art in view of this disclosure, and are included within the scope of the following claims.

We claim:

1. A circuit for use in a magnetic disk drive comprising:
   a sequential device that is configured to select one of a plurality of magnetic heads of the magnetic disk drive;
   a low current drive circuit that is configured to provide a source of a low current signal to the select one of the plurality of magnetic heads;
   a sense circuit that is configured to:
     sense a flow of the low current signal through the select one of the plurality of magnetic heads, and
     provide a test result in dependence upon the flow of the low current signal; and
   a clock device that is configured to trigger the sequential device to sequentially select each of the plurality of magnetic heads as the select one.

2. The circuit of claim 1, further including:
   a status register that is configured to store the test result corresponding to the flow of the low current signal through the select one of the plurality of magnetic heads,
   such that after a number of cycles of the clock device, the status register contains the test result corresponding to each of the plurality of magnetic heads.

3. The circuit of claim 1, wherein
   the clock device includes a ring oscillator and a frequency divider, and
   the ring oscillator is also configured to provide a high frequency signal that facilitates a characterization of one or more of the plurality of magnetic heads.

4. The circuit of claim 1, wherein the plurality of magnetic heads includes a set of Magneto-Resistive (MR) heads that are configured as read heads for reading information from a magnetic medium.

5. The circuit of claim 1, wherein the plurality of magnetic heads includes a set of Thin-Film (TF) heads that are configured as write heads for writing information to a magnetic medium.

6. The circuit of claim 1, wherein the plurality of magnetic heads includes:
   a set of Magneto-Resistive (MR) heads that are configured as read heads for reading information from a magnetic medium, and
   a set of Thin-Film (TF) heads that are configured as write heads for writing information to the magnetic medium.

7. The circuit of claim 6, wherein
   the sequential device is further configured to select each of the plurality of magnetic heads via an alternating selection from the read heads and the write heads, such that a read head is selected before a corresponding write head is selected.

8. The circuit of claim 1, further including:
   a read sensor that is configured to provide information bits corresponding to magnetic fields in the vicinity of a read head of the plurality of magnetic heads, and
   a test signal that includes at least a first state and a second state,
   wherein
   the test signal
     enables the sequential device and the low current drive circuit when in the first state, and
     disables the sequential device and the low current drive circuit when in the second state, thereby allowing the read sensor to provide the information bits.

9. The circuit of claim 1, further including:
   a high current write driver that is configured to provide high current to a write head of the plurality of magnetic heads to create magnetic fields corresponding to information bits on a magnetic medium, and
   a test signal that includes at least a first state and a second state,
   wherein
   the test signal
     enables the sequential device and the low current drive circuit when in the first state, and
     disables the sequential device and the low current drive circuit when in the second state, thereby allowing the high current write driver to provide the high current to the write head.

10. The circuit of claim 9, wherein
    the test signal is configured to transform the high current write driver into the low current drive circuit when in the first state, by a modification to one or more voltage sources of the high current write driver.

11. A method for determining connectivity of a plurality of magnetic heads in a disk drive, comprising:
    sequentially selecting each head of the plurality of magnetic heads, modifying a voltage source of a high current drive circuit to provide a low current to the selected head, sensing a flow of the current through the head to form a test result, storing the test result at a location in a register that is associated with the selected head, and generating a clocking signal that facilitates the sequential selecting of each head of the plurality of magnetic heads.

12. The method of claim 11, wherein the plurality of magnetic heads includes a set of Magneto-Resistive (MR) heads that are configured as read heads for reading information from a magnetic medium.

13. The method of claim 11, wherein the plurality of magnetic heads includes a set of Thin-Film (TF) heads that are configured as write heads for writing information to a magnetic medium.

14. The method of claim 11, wherein the plurality of magnetic heads includes:

a set of Magneto-Resistive (MR) heads that are configured as read heads for reading information from a magnetic medium, and a set of Thin-Film (TF) heads that are configured as write heads for writing information to the magnetic medium.

15. The method of claim 14, wherein sequentially selecting each head of the plurality of magnetic heads includes alternately selecting the read heads and write heads such that each read head is selected immediately prior to a selection of each corresponding write head.

16. A disk drive comprising:

a plurality of magnetic heads that facilitate reading and writing to a magnetic medium;

a microcontroller that is configured to transfer information to and from the magnetic medium;

a preamplifier, operably coupled to the microcontroller and the plurality of magnetic heads, that is configured to:

convert the information from the microcontroller into drive currents that are applied to select write heads of the plurality of magnetic heads, and convert sensed currents from select read heads of the plurality of magnetic heads to provide the information to the microcontroller; and a clock device;

wherein the preamplifier also comprises:

a sequential device that is configured to select one of the plurality of magnetic heads of the magnetic disk drive;

a low current drive circuit that is configured to provide a source of a low current signal to the select one of the plurality of magnetic heads;

a sense circuit that is configured to:

sense a flow of the low current signal through the select one of the plurality of magnetic heads, and provide a test result in dependence upon the flow of the low current signal; and a status register that is configured to store the test result corresponding to the flow of the low current signal through the select one of the plurality of magnetic heads, and the clock device is configured to:

trigger the sequential device to sequentially select each of the plurality of magnetic heads as the select one, and generate a high frequency signal that facilitates a characterization of a read head of the plurality of magnetic heads.

17. The disk drive of claim 16, further including:

a high current driver that provides the drive current, and a test signal that affects a voltage source of the high current driver so that the high current driver is thereby configured to be the low current drive circuit when the test signal is asserted.

* * * * *

Disclaimer 6,424,475—Sanjay Manohar Bhandari, Sunnyvale, CA (US); David Allouche, Belmont; Dennis Pu, San Jose, CA (US). MAGNETIC MEDIUM STORAGE APPARATUS WITH READ CHANNEL HAVING A PROGRAMMABLE WRITE-TO-READ SUPPRESSION. Patent dated July 23, 2002. Disclaimer filed March 28, 2008, by the assignee, Koninklijke Philips Electronics N.V.

Hereby enters this disclaimer to all claims of said patent.

(*Official Gazette October 7, 2008*)